Figures 1, 2, 3, 4:
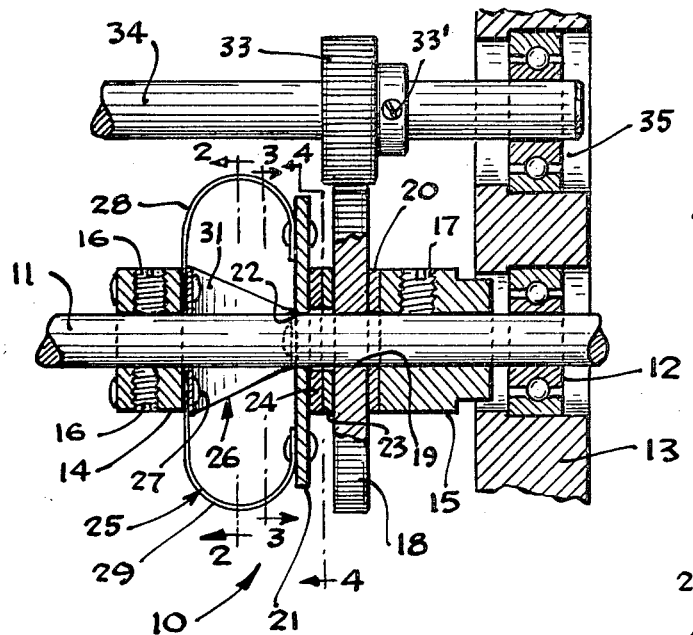

United States Patent
Chinlund, deceased et al.

[15] 3,662,570
[45] May 16, 1972

[54] TORQUE LIMITING CLUTCH

[72] Inventors: Joseph F. Chinlund, deceased, 1224 Glenoak Lane, late of Northbrook, Ill. 60062, Carol B. Chinlund, executrix

[22] Filed: Mar. 19, 1970

[21] Appl. No.: 20,956

[52] U.S. Cl. ............................................64/30 C, 192/89 B
[51] Int. Cl. ..............................................................F16d 7/02
[58] Field of Search ..................64/30 R, 30 C; 192/56, 89 B

[56] References Cited

UNITED STATES PATENTS

| | | | |
|---|---|---|---|
| 2,503,262 | 4/1950 | Hall | 64/30 C UX |
| 2,050,542 | 8/1936 | Pace | 64/30 C UX |
| 923,134 | 6/1909 | Brown | 64/30 R X |
| 2,631,708 | 3/1953 | Holstein | 64/30 R X |
| 1,827,039 | 10/1931 | Ragan | 64/30 C UX |

Primary Examiner—Allan D. Herrmann
Attorney—Mason Kolehmainen and Rathburn & Wyss This application filed under Rule 47.

[57] ABSTRACT

There is disclosed a torque limiting clutch having a pair of cooperable torque transmitting members coupled by a pair of clutch members. Torque is transmitted via leaf spring means secured to one torque transmitting member and one clutch member. The leaf spring means is bowed and urges the clutch members together. The amount of torque which the clutch can transmit before slippage occurs between the clutch members is adjustable by changing the amount of bowing in the leaf spring means.

9 Claims, 4 Drawing Figures

PATENTED MAY 16 1972 3,662,570

TORQUE LIMITING CLUTCH

This invention relates to the art of torque limiting clutches.

The invention comprises an improved arrangement of components including input and output torque transmitting members coupled by bowed leaf spring means which transmits torque and which enables the force between cooperating clutch members to be adjusted by varying the amount of bowing of the leaf spring means.

In accordance with a specific embodiment of the invention there are provided a pair of collars secured to a shaft, a torque transmitting member rotatably received by and with respect to the shaft, a frictional clutch member secured to or formed on the torque transmitting member, a mounting plate received by the shaft for mounting another frictional clutch member, and leaf spring means secured to one of the collars and to the mounting plate. The leaf spring means exerts a force which urges the clutch members into clutching engagement with each other. Adjustment of the position of one of the collars effects adjustment of the amount of force exerted by the leaf spring means. It is preferred to use two leaf springs, each having two sections. The force exerted by the sections on the clutch members is uniform. The sections are placed under stress and are normally bowed to such an extent that they press the clutch members together with the desired amount of force.

In the drawings:

FIG. 1 is a view, mainly in section, of a torque limiting clutch in accordance with the invention; and FIGS. 2, 3 and 4 are sectional views taken along respective lines 2—2, 3—3 and 4—4, of FIG. 1.

In the drawings, there is shown a torque limiting clutch generally indicated at 10. A shaft 11 is shown to be rotatably mounted by a bearing 12 mounted in a frame 13. Collars 14 and 15 are disposed on the shaft 11 at spaced apart locations. Set screws 16 adjustably secure the collar 14 to the shaft 11, and a set screw 17 adjustably secures the collar 15 to the shaft 11. Any other suitable means for adjustably securing the collars 14 and 15 to the shaft 11 can be provided. A torque transferring member 18, specifically a spur gear, has a central bore 19 through which the shaft 11 extends. The member 18 is freely rotatable about and axially shiftable relative to the shaft 11. A bearing or pressure plate 20 has its one side surface in abutment with the collar 15 and its other side surface in abutment with one side surface of the member 18. A mounting plate 21 has a bore 22 through which the shaft 11 extends. The plate 21 is shiftable axially along the shaft 11.

A frictional member 23 shown to take the form of a clutch plate is suitably secured to one side of the member 18, and a frictional member 24 shown to take the form of a clutch plate is secured to one side of the mounting plate 21.

Torque and axial force tending to press the frictional members 23 and 24 together is illustrated as being exerted by leaf springs 25 and 26. Both leaf springs 25 and 26 are normally flat, but in the assembled position shown in the drawing they are stressed and bowed. Each leaf spring 25 and 26 is secured to the collar 14 at its midsection by rivets 27. The spring 25 is considered to have two bowed sections 28 and 29, and the spring 26 is considered to have two bowed sections 30 and 31. Ends 28' and 29' of sections 28 and 29 and ends 30' and 31' of sections 30 and 31 are secured to the mounting plate 21, at equally spaced apart locations about the shaft 11, by rivets 32. In the position shown in FIG. 1, all four sections 28 through 31 are bowed through angles of about 180°, and are disposed 90° apart.

Gear 18 is shown to be in meshing engagement with a spur gear 33 adjustably secured to shaft 34 by a set screw 33'. The shaft 34 is illustrated as being rotatably mounted by a bearing 35 mounted in the frame 13. The shaft 34 can either be a driving shaft or a driven shaft. More specifically, the clutch 10 will perform its intended function irrespective of whether the gear 18 or the gear 33 is the driving gear or the driven gear.

In operation, let it be assumed that gear 33 is the driving gear and that gear 18 is the driven gear, and that the maximum transmitted torque for which the clutch 10 is adjusted is not being exceeded. The clutch member 23 drives the clutch member 24 and its mounting member or plate 21. The leaf springs 25 and 26 transmit torque to the collar 14 and hence to the shaft 11. In short, the member 18 and its frictional member 23, the collars 14 and 15, the pressure plate 20, the mounting plate 21 and its frictional member 24, the leaf springs 25 and 26 and the shaft 11 rotate as a unit. If the torque for which the clutch 10 is adjusted is exceeded, slippage will occur between frictional members 23 and 24, and hence the torque attempted to be transmitted between shafts 34 and 18 is limited.

In order to adjust the amount of torque which can be transmitted by the clutch 10, the set screws 16 can be loosened and the collar 14 can be shifted axially on the shaft 11 to the desired position, and the set screws can be tightened. Accordingly, the clutch 10 will transmit either more or less torque depending on the direction in which the collar 14 was shifted relative to the shaft 11. Alternatively, the clutch 10 can be adjusted by loosening the set screw 17, shifting the collar axially to the desired position on the shaft 11, and thereupon tightening the set screw 17. If this alternative adjustment is used, one of the gears, such as the gear 33, can be made wider than the other gear 18 as shown in FIG. 1 so that there will always be full contact therebetween to obviate changing the adjusted position of the gear 33 with respect to the shaft 34.

What is claimed is:

1. A torque limiting clutch, comprising: a shaft, first and second collars received by and secured to said shaft at spaced apart locations, means for adjustably securing at least one of said first and second collars to said shaft, a torque transmitting member received by said shaft and rotatable relative to said shaft, a first clutch plate received about said shaft and secured to said torque transmitting member, a second clutch member received about said shaft and being cooperable with said first clutch plate, a mounting plate secured to said second clutch member and received about said shaft, and leaf spring means secured to said first collar and to said mounting plate.

2. A torque limiting clutch as defined in claim 1, wherein said leaf spring means includes a leaf spring which is bowed, and said means for adjustably securing one of said collars enables the amount of bowing to be adjusted.

3. A torque limiting clutch as defined in claim 1, wherein said leaf spring means includes a leaf spring having a pair of ends and a midsection, said midsection being secured to said first collar and said ends being connected to said mounting plate.

4. A torque limiting clutch as defined in claim 1, wherein said leaf spring means includes a plurality of leaf springs.

5. A torque limiting clutch as defined in claim 1, wherein said means for adjustably securing one of said collars enables said collar to be shifted along said shaft and to be held in its adjusted position.

6. A torque limiting clutch as defined in claim 1, wherein said means for adjustably securing one of said collars includes means for adjustably securing one of said collars to a desired position longitudinally along said shaft.

7. A torque limiting clutch as defined in claim 1, wherein said leaf spring means includes a pair of bowed sections, each of said sections being bowed through about 180°.

8. A torque limiting clutch as defined in claim 1, wherein said leaf spring means includes a pair of oppositely disposed leaf spring sections.

9. A torque limiting clutch as defined in claim 1, including a pair of leaf springs offset with respect to each other, each leaf spring being secured to said first collar and to said mounting plate.

* * * * *